UNITED STATES PATENT OFFICE.

HENRY PARKES, OF LONDON, ENGLAND, AND JOHN C. MONTGOMERIE, OF DALMORE, STAIR, SCOTLAND.

PROCESS OF EXTRACTING GOLD OR SILVER FROM ORES OR COMPOUNDS CONTAINING SAME.

SPECIFICATION forming part of Letters Patent No. 496,951, dated May 9, 1893.

Application filed October 25, 1892. Serial No. 449,976. (No specimens.) Patented in England July 3, 1891, No. 11,342; in India June 7, 1892, No. 142; in Cape Colony June 11, 1892, No. 769, and in Brazil June 25, 1892, No. 1,473.

*To all whom it may concern:*

Be it known that we, HENRY PARKES, of 237 Friern Road, Dulwich, London, in the county of Surrey, England, and JOHN CUNINGHAME MONTGOMERIE, of the Water of Ayr and Tam O'Shanter Hone Works, Dalmore, Stair, in the county of Ayr, Scotland, subjects of the Queen of Great Britain and Ireland, have invented certain new and useful Improvements in the Extraction of Gold and Silver from Ores or Compounds Containing the Same, (for which we have obtained Letters Patent in Great Britain, dated July 3, 1891, No. 11,342; in British India, dated June 7, 1892, No. 142; in Cape Colony, dated June 11, 1892, No. 769, and in Brazil, dated June 25, 1892, No. 1,473,) of which the following is a specification.

This invention relates to the treatment of auriferous and argentiferous ores or compounds for the purpose of separating and collecting the gold and silver contained therein; the same being specially adapted for use with ores of a refractory character.

In carrying out our invention, we add to one ton of ore nine gallons of hydrochloric acid (specific gravity 1.2), or its equivalent of a chloride salt and sulphuric acid, together with sufficient water, preferably warm (say at about 180° Fahrenheit), to reduce the mass to the consistency of thin mortar. In some cases, when employing hydrochloric acid, we find it useful to combine a little common salt or other chloride therewith. The chloridizing agent may, however, be derived from any other chlorine-yielding source; for instance, from hypochlorite with dilute sulphuric, hydrochloric or other acid of lime or from chromic acid with hydrochloric acid or with salt and sulphuric acid. The charge is placed in any suitable vessel to which oxygen gas at a pressure of from fifty to one hundred pounds per square inch is admitted. The vessel is well agitated for from two to six hours; the temperature being maintained at about 180° Fahrenheit. A barrel is most convenient for this purpose, and is kept in rotation the whole time the action is going on. The time will, however, vary according to the refractory character of the ore under treatment, the quantity of the metal to be acted on, the strength of the chemical agent used, the temperature employed and the pressure of the oxygen. The barrel is then discharged and a quantity of water added to its contents. Should any gold or silver be found in solution, it is separated by any of the known means; or may be precipitated by the addition of metallic copper or iron; the whole being then allowed to remain until the solid matters subside, whereupon the liquid part is drawn off. The remainder, comprising a little water and the residual ore containing the precious metals, is then neutralized with any suitable alkali, such as caustic soda, and treated with cyanide of potassium or other solvent or in any known manner for the recovery of the precious metals. Instead of waiting for the solid matters to subside, the charge may, after dilution with water, be forthwith filtered and the solid portion neutralized or washed for the removal of acid.

It will in certain cases be found advantageous to separate some of the earth or silicious matters from the ores by a concentrating or winnowing process, or by means of a centrifugal or other concentrating machine.

What we claim as our invention, and desire to secure by Letters Patent, is—

1. The herein-described method of extracting gold and silver from ores or compounds containing the same, consisting in treating the ore with a chloridizing agent in the presence of oxygen under pressure.

2. The herein-described process for extracting gold and silver from ores or compounds containing the same by an uninterrupted operation consisting in saturating the ore with chlorine and subjecting the same to agitation in the presence of oxygen under pressure, then filtering and washing the ore and ultimately recovering the precious metals from the liquor by precipitation or other known means.

HENRY PARKES.
JOHN C. MONTGOMERIE.

Witnesses to the signature of Henry Parkes:
H. HUGHES,
EDMUND S. SNEWIN.

Witnesses to the signature of John Cuninghame Montgomerie:
W. C. BUCHANAN,
W. M. LOCKHART.